United States Patent [19]

Jacobson et al.

[11]  4,429,756

[45]  Feb. 7, 1984

[54] WEIGHING SCALE

[75] Inventors: Walter E. Jacobson, Meriden; Douglas Bliss, Wallingford, both of Conn.

[73] Assignee: Revere Corporation of America, Wallingford, Conn.

[21] Appl. No.: 322,197

[22] Filed: Nov. 17, 1981

[51] Int. Cl.³ .............................................. G01G 3/14
[52] U.S. Cl. .................................... 177/211; 73/862.35
[58] Field of Search ....................... 177/211; 73/862.35

[56] References Cited

U.S. PATENT DOCUMENTS 2,899,191  8/1959  Hunt .................................... 177/211
3,938,603  2/1976  Shoberg et al. ..................... 177/211
4,098,365  7/1978  Pietzsch et al. ..................... 177/211
4,361,199  11/1982  Ulicny .............................. 177/211 X

FOREIGN PATENT DOCUMENTS 2938507  7/1980  Fed. Rep. of Germany ...... 177/211
2929137  2/1981  Fed. Rep. of Germany ...... 177/211

Primary Examiner—George H. Miller, Jr.

[57]  ABSTRACT

A platform scale with a low overall height primarily for use as a bathroom scale. A platform receives the load to be weighed and transfers a force to a lever arrangement that converts strains due to load into an electrical signal which is then converted to a weight indication.

4 Claims, 8 Drawing Figures

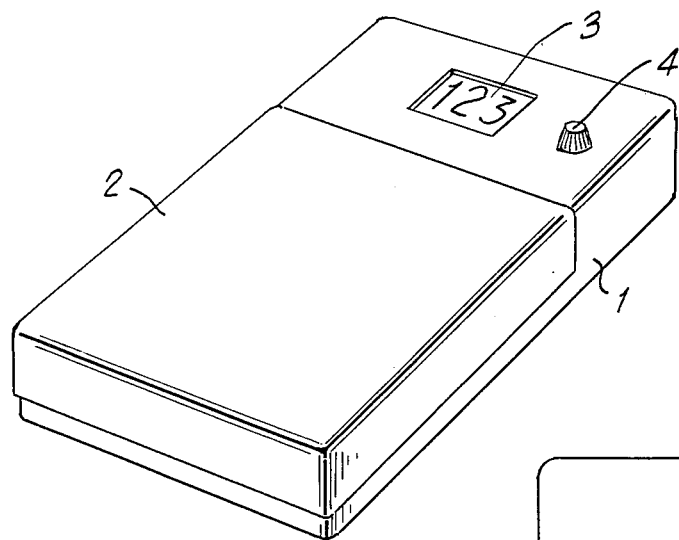
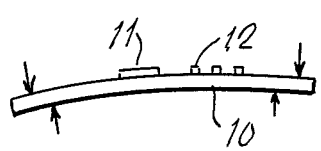
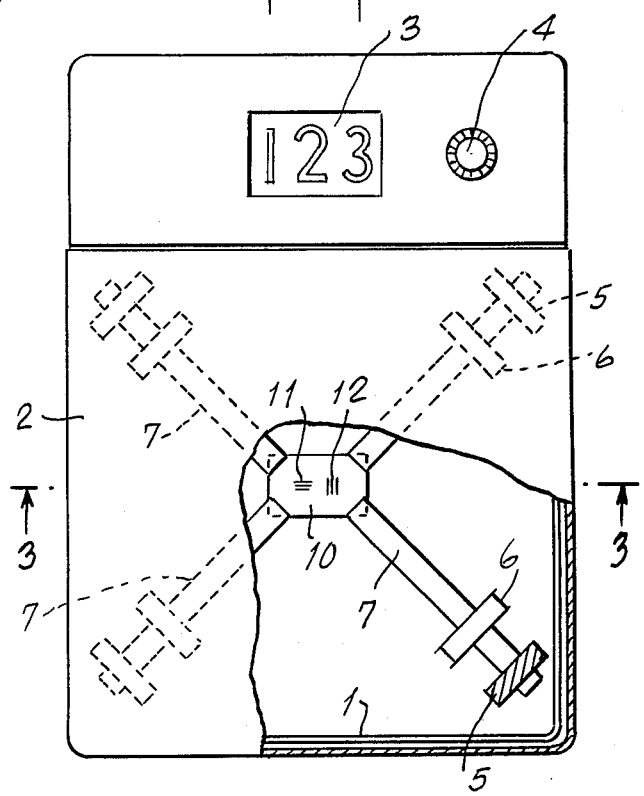
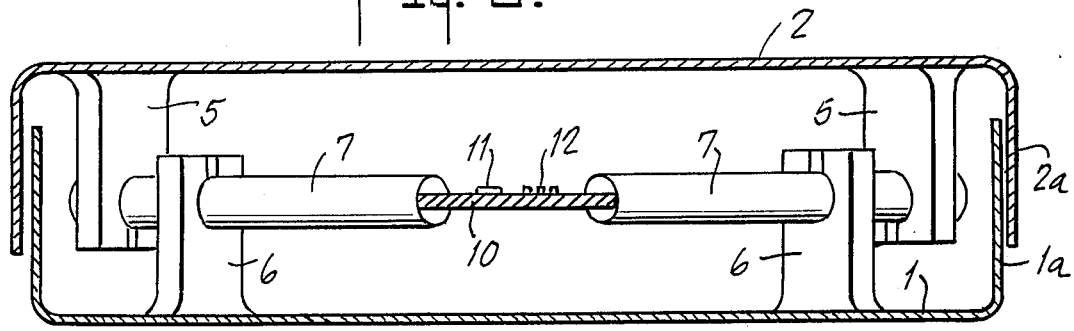

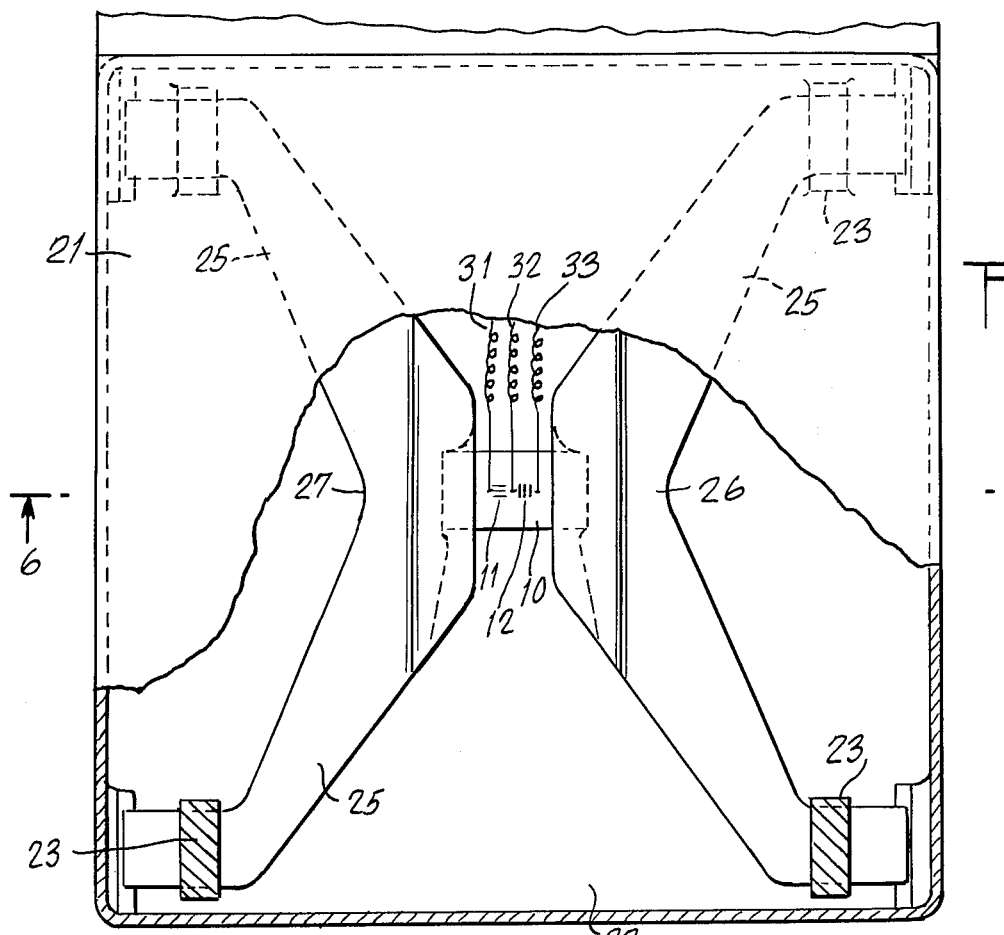
Fig. 5.
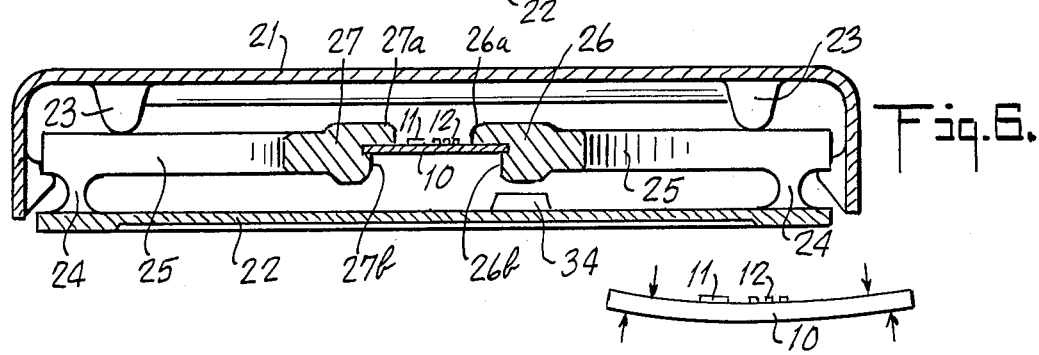
Fig. 6.
Fig. 7.
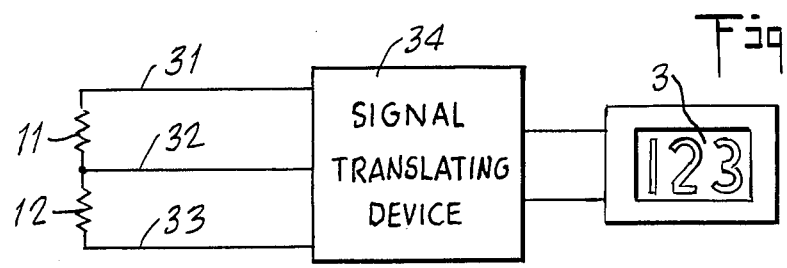
Fig. 8.

WEIGHING SCALE

BRIEF SUMMARY

This invention relates to weighing scales, and particularly to platform scales having a low overall height. It is intended primarily for use as a bathroom scale for weighing a person. It is applicable to other types of scales and force measuring instruments.

The scale includes a platform for receiving the load to be weighed, a lever arrangement for supporting the platform, and a force translating means restraining the movement of the lever arrangement and effective to convert strains due to the load into an electrical signal. The electrical signal is converted by means known in the art to a weight indication. A calibration adjustment may be provided.

DRAWINGS

FIG. 1 is a perspective view of a bathroom scale embodying the invention.

FIG. 2 is a plan view of the scale of FIG. 1, with part of the platform broken away to reveal the interior structure.

FIG. 3 is a cross-sectional view taken on the line 3—3 of FIG. 2.

FIG. 4 is a diagrammatic view illustrating the response of the force translating means to a load on the platform.

FIG. 5 is a plan view of a modification, with parts broken away to illustrate the interior structure.

FIG. 6 is a sectional view on line 6—6 of FIG. 5.

FIG. 7 is a diagrammatic view similar to FIG. 4 but relating to the embodiment of FIGS. 5 and 6.

FIG. 8 is a diagram of an electrical circuit used in the scale.

DETAILED DESCRIPTION

FIGS. 1-4

These figures illustrate one embodiment of the invention, which includes a base 1 and a platform 2 to receive the feet of a person or another load to be weighed. An indicator 3 shows the weight of the load. A knob 4 provides a calibration adjustment.

The sides of the platform 2 extend downwardly as shown at 2a in FIG. 3 and overlap the upwardly extending sides 1a of the base 1. Four legs 5 extend downwardly from the platform 2 adjacent the corners thereof. Four posts 6 extend upwardly from the base 1. The posts 6 are apertured near their upper end and the legs 5 are apertured near their lower end to receive four diagonally extending levers 7.

A bendable member 10, shown as rectangular, and which may be a sheet steel stamping, has its four corners received in closely fitting recesses on the inner ends of the levers 7. The bendable member carries two strain responsive elements shown as a resistance element 11 with its principal conductors extending horizontally as viewed in FIG. 2 and another resistance element 12 having its principal conductors extending vertically as shown in FIG. 2.

In the illustrated embodiment, the bendable member 10 is shown as horizontally elongated, as best seen in FIG. 2, so as to provide marginal portions at each end to engage the ends of the levers 7 and to provide a middle section to receive the strain gages 11 and 12. This particular configuration is selected for convenience of manufacture. The bendable member 10 may have other configurations, such as circular, triangular, or other polygonal configurations.

When a load is received on the platform 2, the legs 5 are forced downwardly, thereby pivoting the levers 7 about the posts 6, which serve as fulcrums for the levers. The inner ends of the levers are all moved upwardly as viewed in FIG. 3, thereby bending the member 10 in an upwardly convex configuration, as shown diagrammatically in FIG. 4. It may there be seen that each lever applies to an end of the member 10 a moment which is clockwise at the right-hand end and counterclockwise at the left-hand end, as viewed in that figure. The bendable member 10 is made of material substantially stiffer than the levers 7, so that the moments applied to the levers are resisted principally by the member 10, rather than by the levers themselves. The recesses at the inner ends of the levers, which receive the corners of the member 10 are made as tight as possible, to make the scale respond substantially as though the levers 7 and the member 10 were integral.

The levers 7 are fastened to the legs 5 and to the posts 6 by any suitable means, which may be a snap fit, a friction fit, or a ball joint.

Since there may be lost motion in the joints between the levers and the other parts of the scale, the apparatus may not respond accurately to light loads which do not forcefully take up all the lost motions in those joints. However, such a response is conventional with bathroom scales. Accuracy with light loads is not a part of the design requirements of such a scale.

FIGS. 5-7

The figures illustrate a modification of the invention in which a platform 21 is supported on a base 22. The platform has four downwardly depending legs 23. The base 22 has four upstanding posts 24 which are shown as being integral with the base and with the ends of levers 25. The levers 25 at the right-hand side of the scale have their inner ends connected by a bridge 26. The levers 25 at the left-hand side of the scale have their inner ends connected by a bridge 27.

A bendable member 10, which corresponds in function and structure to the bendable member 10 of FIGS. 1-3 has its ends inserted into slots formed on the inside ends of the bridge members 26 and 27. The bridge members 26 and 27 have extensions 26a and 27a overlying the upper sides of the bendable member 10. The bridge members 26 and 27 have shorter extensions 26b and 27b engaging the underside of the bendable member 10. The difference in the lengths of the two extensions on each bridge member facilitates insertion of the bendable member 10 into the slots in the bridge members 26 and 27 during assembly. The levers 25 may be deflected upwardly to widen the gap between the bridge members and further facilitate the assembly.

When a load is applied to the platform 21, the legs 23 engage the levers 25 inside of the posts 24 and bend the levers 25 downwardly thereby bending the member 10 so that it is downwardly convex, as illustrated in FIG. 7.

The strain gage resistance elements 11 and 12 on the member 10 are provided with flexible electrical connections 31,32,33 to accommodate the vertical movements of the flexible member which accompanies the operation of the scale. The connections 31,32,33 lead to a signal translating apparatus 34 diagrammatically shown in FIG. 8. This signal translating apparatus 34 is well known in the art. It includes two or more resistance elements which comprise the other half of a bridge circuit containing the strain gage resistance elements 11 and 12 which are located in two arms of the bridge, a suitable amplifier, and an analog-to-digital converter to change the analog signal produced by the bridge circuit to a digital signal suitable for operating a digital indicator such as shown at 3. If an analog indicator is used instead of a digital indicator, the analog-to-digital converter is of course not needed. The signal translating apparatus also includes calibration adjustment means which may be operated by the knob 4 in FIG. 1.

Temperature compensation may be provided in the signal translating apparatus, if required. Several suitable temperature compensating techniques are known in the art.

A projection 34 extends upwardly from the base 22 into the path of movement of bridge 26 and serves to limit the movement of that bridge and thereby to limit the load which may be applied to the member 10. A similar projection (not shown) may be provided under the bridge 27.

The platform 21 has a skirt 21a provided with inward projection 21b. The skirt 21a flexes outwardly to allow assembly of the platform with the base. The projections 21b thereafter resist separation of the platform from the base.

Instead of the strain sensitive resistance elements described above, other elements electrically responsive to strain may be used, such as crystal or semiconductor elements.

Instead of arranging the two elements to detect strains at right angles, both may be arranged to detect strains in the same direction. Alternatively, a single strain sensitive element, or more than two, could be utilized.

As an alternative to the half-bridge arrangement of the strain sensitive elements, they could be connected as a one-quarter or three-quarter bridge, or as a full bridge.

The joints between the levers 7, the posts 6 and the legs 5 may be knife edge and V-groove joints, as is common in the scale art. The knife edges may be on either part of the joint and the V-groove on the other part.

The legs 5 and the posts 6 may be constructed with two vertically spaced regions of reduced cross-section, which serve as flexures to allow horizontal movement of the free end of each leg or post with respect to its fixed end. Thus, each pair of diagonally opposite levers would be able to separate or to move toward one another, to accommodate various locations of application of the load to the platform. Furthermore, each pair of diagonally opposite levers would be relatively stiff and resistive to forces acting at right angles to their length.

This invention lends itself to the production of a low cost scale. For example, the bendable member 10 may be a metal stamping, as mentioned above, and the platform base, and levers may be of a suitable molded plastic, eg, nylon, polycarbonate or other.

The bendable member 10, if made circular, as suggested above, could have the strain sensitive elements arranged circumferentially to measure tangential stresses or radially to measure radial stresses, or some combination of both.

The strain sensitive elements may be arranged on either the top or the bottom surface of the member 10, or on both surfaces. It is most convenient to have them on one surface only.

The use of knife edge and V-groove joints would make constant the distances between the strain sensitive element and the points of application of the load, so that the scale should be less susceptible to error caused by changes in the position of the load on the platform.

We claim:

1. A weighing scale, comprising:
   a. a rectangular platform for receiving a load to be weighted;
   b. a rectangular base including four fulcrum means adjacent the corners of the base;
   c. lever means including four deflectable arms extending diagonally inward from the corners of the base, said arms being supported by said fulcrum means, said lever means having recesses adjacent the inner ends of said arms;
   d. four means on the platform abutting the four levers at points spaced from the four fulcrum means, for transferring the load from the platform to the lever means;
   e. a bendable rectangular plate member having end portions tightly received in the recesses of the lever means;
   f. strain gage means on said bendable plate member for converting the strains developed therein into an electrical signal; and
   g. weight indicating means responsive to the electrical signal.

2. A weighing scale as in claim 1, in which said arms are separate, and said recesses are slots on the inner ends of the arms, each slot receiving tightly a corner of the plate member.

3. A weighing scale as in claim 1, in which each of two pairs of lever arms have their inner ends connected by bridges integral with the arms, and the recesses are slots in the inwardly facing surface of the integral bridges, each slot receiving tightly one end of the plate member.

4. A weighing scale as in claim 3, in which each bridge has an upper extension overlying the plate member and a lower extension engaging the under side of the plate member, said extensions defining said slots, said lower extensions being shorter than the upper extensions to facilitate assembly of the plate and the bridge members.

* * * * *